J. B. DUNLAP.
SWING.
APPLICATION FILED SEPT. 11, 1918.

1,307,774.

Patented June 24, 1919.
2 SHEETS—SHEET 1.

INVENTOR
Jos. B. Dunlap
BY
ATTORNEYS

J. B. DUNLAP.
SWING.
APPLICATION FILED SEPT. 11, 1918.
1,307,774.
Patented June 24, 1919.
2 SHEETS—SHEET 2.
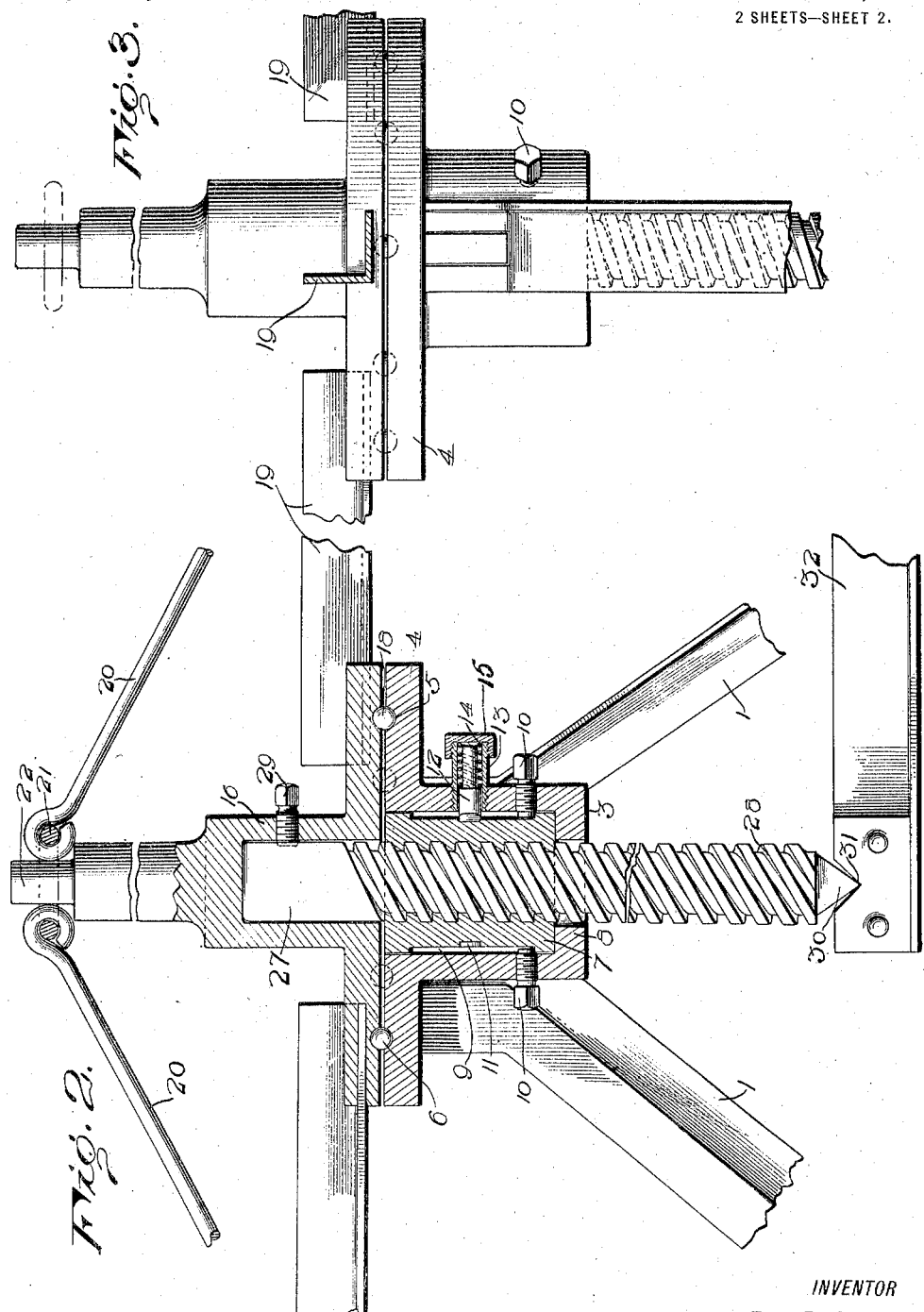
INVENTOR
Jos. B. Dunlap.
BY
ATTORNEYS

UNITED STATES PATENT OFFICE.

JOSEPH B. DUNLAP, OF TULSA, OKLAHOMA.

SWING.

1,307,774.   Specification of Letters Patent.   Patented June 24, 1919.

Application filed September 11, 1918. Serial No. 253,549.

*To all whom it may concern:*

Be it known that I, JOSEPH B. DUNLAP, a citizen of the United States, and a resident of Tulsa, in the county of Tulsa and State of Oklahoma, have invented certain new and useful Improvements in Swings, of which the following is a specification.

My invention is an improvement in swings, and has for its object to provide a device of the character specified, wherein the swing is operated by gravity, a fixed screw being provided, with which coöperates a nut carrying the seats or cars for the passengers, the nut and the cars or seats being rotated about the axis of the screw by the downward movement of the nut under the weight of the swing and its occupants.

In the drawings:

Fig. 2 is a vertical section through the nut and its support;

Fig. 3 is a side view of the same.

Figure 1:
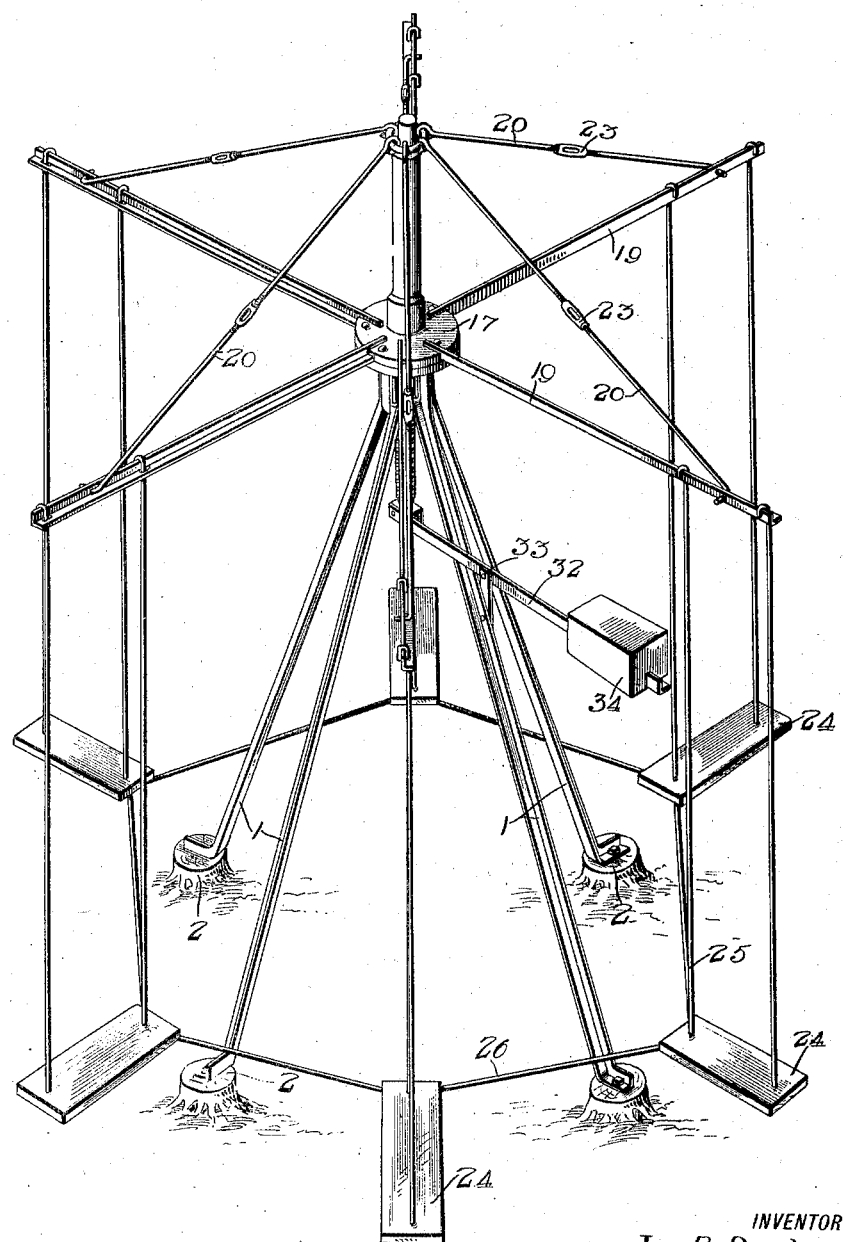
Figure 1 is a perspective view of the improved swing.

In the embodiment of the invention shown, the improved swing comprises a suitable support, in the present instance formed by four converging uprights 1 of angle material, the lower ends of the uprights having feet 2 which are connected with fixed supports firmly embedded in the ground as shown. At their upper ends the uprights 1 converge to a connection with a bearing 3. This bearing has a marginal flange 4 at its upper end, and this flange has upon its upper face an annular groove 5 which forms the lower section of a race for a ball-bearing indicated at 6. A nut 7 is held in the bearing 3, and it will be noticed, referring to Fig. 2, that the said bearing has at its lower end an inwardly extending rib 8 for limiting the downward movement of the nut. The nut is annularly recessed as indicated at 9 intermediate its ends, and set screws 10 are threaded through the bearing into engagement with this recess at the lower end thereof, to limit the upward movement of the nut, under conditions to be presently described. The nut also has an annular series of ratchet teeth 11 with which coöperates a pawl 12, held in a casing 13 having threaded engagement with an opening in the bearing. A spring 14 encircles the reduced outer end of the pawl and normally presses the pawl inward, a cap 15 engages the casing 13 at its outer end to hold the spring and pawl in place. The standard formed by the uprights 1 and connected parts is a fixed portion of the swing. The movable portion comprises a cap 16 having at its lower end a marginal flange 17, of approximately the same diameter as the flange 4 of the bearing 3. This flange 17 has an annular groove 18 in its lower face, registering with the groove 5, and forming the upper section of the race for the balls 6. Arms 19 of angle material extend radially from the flange 17 at regular intervals with respect to each other, and the upper ends of these arms are supported by guy rods 20. Each of these rods is connected at its lower end to an arm 19 near its outer end, at its upper end to a ring 21 encircling the reduced upper end 22 of the cap 16. A turn buckle 23 is interposed in the length of each rod 20 and it will be obvious that by means of the turn buckle the effective length of each rod 20 may be varied. Seats or cars may be supported by the arms 19, seats indicated at 24 being provided in the present instance. These seats are supported by links 25 which have hooks at their upper ends engaging over the vertical portions of the angle bars 19, and each link passes through the horizontal portion of the angle bar with which it is connected. The seats are connected and held in spaced relation by flexible members 26, which may be cables, rods or the like. The head 27 of a screw 28 is held in the cap 16 by means of a set screw 29, and this screw 28 is threaded through the nut 7. Referring to Fig. 2, it will be noticed that the pitch of the screw and of the nut is a coarse pitch, being such that the weight of the movable portion of the swing with its passengers will cause the movable portion of the swing to rotate when it is supported by the screw alone. The lower end of the screw is pointed as indicated at 30, and rests in a notch or recess 31 in the inner end of a counterbalancing lever 32. This lever is pivoted at 33 to one of the uprights 1, and a counterweight 34 is adjustably mounted on the lever 32. As shown, the notch or recess 31 is on the upper face of a block secured to the inner end of lever 32, and said lever is of angle material, as shown. This counterweight 34 is of sufficient weight to move the screw and the parts supported thereby upward, when the cars or seats of the swing are empty.

In operation, the screw normally occupies a position such that the lower end thereof is just beyond the lower end of the bearing 3. It will be evident that when the cars or seats are loaded, the weight of the occupants, together with that of the movable portion of the swing, will force the screw downward, and the inclined faces of the threads of the screw and nut will cause the screw to rotate, carrying with it the connected parts. By the time the screw has reached the position shown in Fig. 2, and where the flange 17 rests upon the balls 6, the swing will be rotating at a fairly rapid rate, and the rotation will continue for quite a time after the parts have reached this position, the nut turning with the screw, which it is free to do. The pawl and ratchet action between the screw and the bearing prevents reverse movement of the screw. After the swing is unloaded the counterweight will lift the screw.

I claim:

A swing comprising a fixed support, and a movable portion, the fixed support carrying a nut, and the movable portion a screw engaging the nut and adapted to be rotated by vertical movement of the screw with respect to the nut, said nut being rotatable with respect to the fixed support freely in one direction and prevented from rotation in the opposite direction, and a counterweight for returning the screw and movable portion to elevated position when the swing is unloaded.

JOSEPH B. DUNLAP.

Witnesses:
BAILEY E. BELL,
F. H. BLAINE.

Copies of this patent may be obtained for five cents each, by addressing the "Commissioner of Patents, Washington, D. C."